United States Patent
Luik et al.

[11] Patent Number: 5,692,803
[45] Date of Patent: Dec. 2, 1997

[54] REAR SEAT SYSTEM FOR A PASSENGER MOTOR VEHICLE

[75] Inventors: Klaus Luik, Mühlacker; Wolfgang Späth, Renningen; Kurt Hinrichs, Weissach, all of Germany

[73] Assignee: Dr. Ing. h.c.F. Porsche AG, Germany

[21] Appl. No.: 706,941

[22] Filed: Sep. 3, 1996

[51] Int. Cl.$^6$ .................. B60N 2/02; B60N 2/36
[52] U.S. Cl. .................. 297/378.12; 297/378.13; 297/483; 280/808; 296/68.1
[58] Field of Search .................. 297/378.12, 378.13, 297/483; 296/68.1; 280/808

[56] References Cited

U.S. PATENT DOCUMENTS

| | | | |
|---|---|---|---|
| 4,206,946 | 6/1980 | Maertens | 297/378.12 X |
| 4,323,278 | 4/1982 | Sukopp et al. | 297/378.13 X |
| 4,348,037 | 9/1982 | Law et al. | 280/808 X |
| 4,561,694 | 12/1985 | Mauri et al. | 297/378.13 |
| 4,572,569 | 2/1986 | Habnann | 297/378.13 X |
| 4,684,175 | 8/1987 | Trutter | 297/378.13 |
| 4,730,875 | 3/1988 | Yoshitsugu | 297/483 X |
| 4,779,927 | 10/1988 | Trutter et al. | 297/378.13 |
| 4,817,754 | 4/1989 | Muramato | 280/808 X |
| 5,044,683 | 9/1991 | Pärsson | 296/68.1 X |
| 5,328,243 | 7/1994 | Akiyama | 297/378.12 |
| 5,383,707 | 1/1995 | Osenkowski et al. | 297/378.12 X |
| 5,398,995 | 3/1995 | Hurite | 297/378.12 |
| 5,570,933 | 11/1996 | Rouhama et al. | 297/483 |
| 5,577,805 | 11/1996 | Glinter et al. | 297/378.12 |
| 5,582,453 | 12/1996 | Leuchtmann et al. | 297/378.13 X |

FOREIGN PATENT DOCUMENTS 29 30 549   2/1981   Germany.

Primary Examiner—Jose V. Chen
Assistant Examiner—Rodney B. White
Attorney, Agent, or Firm—Evenson, McKeown, Edwards & Lenahan, P.L.L.C.

[57] ABSTRACT

A rear seat system for a motor vehicle, particularly a passenger car, has at least one backrest which can be folded from an upright operating position into an approximately horizontal depositing position and has an operating part which releases the backrest locking. Three-point seat belts are provided for the occupants of the rear seat system. In the deposited condition, the belt strap extends close to the vehicle side panel and in the process is situated in the swivel area of the backrest. When the backrest is folded up, the belt strap will not be clamped in between the backrest and the vehicle side panel because the operating part is also used as a guiding part for the adjoining belt strap of the deposited three-point seat belt.

10 Claims, 4 Drawing Sheets

REAR SEAT SYSTEM FOR A PASSENGER MOTOR VEHICLE

BACKGROUND AND SUMMARY OF THE INVENTION

The present invention relates to a rear seat system for a motor vehicle, particularly a passenger car, and more specifically, to a rear seat system comprising at least one backrest foldable from an upright operating position into an approximately horizontal depositing position, an operating part releasing the backrest locking, and three-point seat belts for occupants of the rear seat system, wherein, in the deposited condition, a belt strap of the seat belts extends close to a vehicle side panel from a lower anchoring point to one of an upper belt deflection element and a belt retractor and is also situated in a swivel area of the backrest.

DE-OS 29 30 549 shows a rear seat system for a motor vehicle which comprises at least one backrest which can be folded toward the front. An operating part which releases the backrest locking is provided on an upper, laterally exterior area of the backrest. For the occupants of the rear seat system, a three-point seat belt is assigned to each seat in the deposited condition. The belt strap extends close to the vehicle side panel from a lower anchoring point to an upper belt deflection element or a belt retractor and in the process extends in the swivel area of the backrest.

In such known arrangements, it was found that, particularly when the backrest is folded up from the horizontal depositing position into the upright operating position, a clamping of the belt strap takes place between the exterior side of the backrest and the adjoining vehicle side panel. For eliminating this defect, DE-OS 29 30 549 arranges a deflecting device on the rear side of the backrest close to its upper edge, which deflecting device which approximately adjoins the lateral edge and extends toward the rear and the vehicle center. This deflecting device deflects the belt strap, when the backrest is folded up, in the direction of the side panel of the vehicle so that the lateral edge of the backrest will then move past the belt strap toward the rear without taking along the belt strap. For avoiding the clamping-in of the belt strap, a separate component is therefore required which must be fastened to the rear side of the seat.

It is an object of the present invention to improve a motor vehicle rear seat system such that, while the expenditures are reduced, a clamping-in of the belt strap is avoided, particularly when the backrest is folded up.

According to the present invention, this object has been achieved by constructing the operating part so that it is simultaneously used as a guiding element for the adjoining belt strap of the deposited three-point seat belt.

Among the principal advantages achieved with the present invention are that, by using the operating part applied for releasing the backrest locking as the belt strap guide, the rear seat system prevents a clamping-in of the belt strap when the backrest is folded up and yet a simple construction and can be inexpensively produced. The manufacturing and mounting of a separate part is therefore not necessary. Along its entire width, the belt strap preferably rests on the top side of a grip section of the operating part. On its top side, the grip section has a guiding section for the belt strap, in which case the guiding section rises in the direction of the side panel of the vehicle and thus counteracts a lateral slipping of the belt strap toward the outside. In the frontal view, the guiding section has a curved course. For an additional securing against a lateral slipping of the belt strap, in inwardly directed nose-shaped or bow-shaped elevation is constructed locally on the guiding section. With this construction of the grip section, the deposited belt strap is guided in all positions of the backrest and cannot be clamped in.

Other objects, advantages and novel features of the present invention will become apparent from the following detailed description of the invention when considered in conjunction with the accompanying drawings.

DETAILED DESCRIPTION OF THE DRAWINGS

Figure 1:
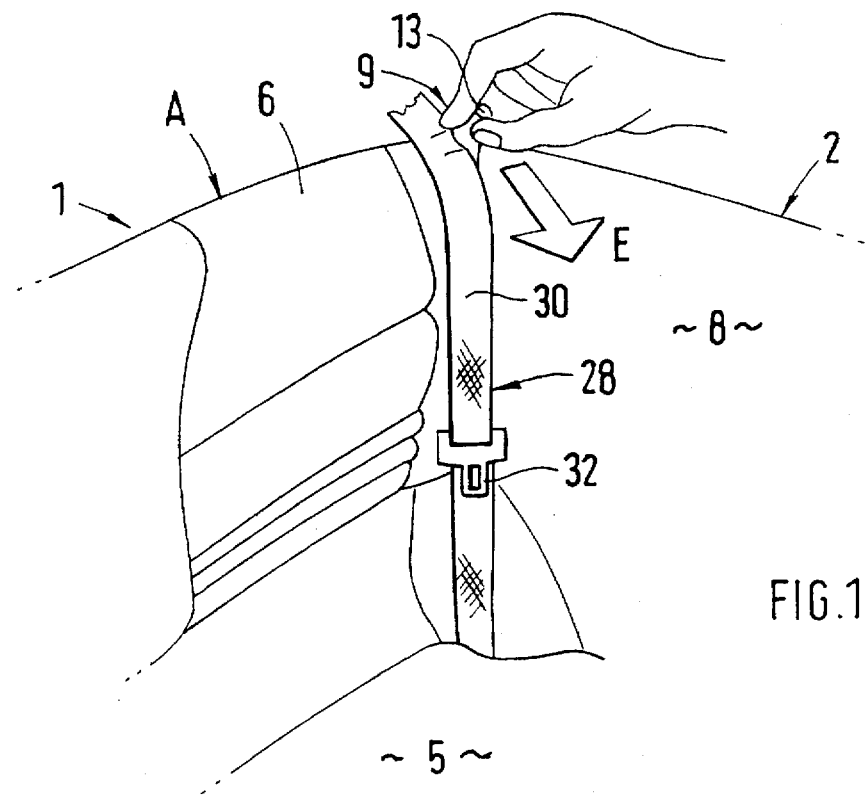
FIG. 1 is a perspective, partial view of a side of the rear seat system for a passenger car with a three-point seat belt in the deposited condition, with the backrest taking up an upright operating position.

A rear seat system designated generally by numeral 1 for a vehicle formed by a passenger car 2 comprises, on both sides of a longitudinally extending transmission tunnel 3, one seat cushion 5 respectively placed in a seat recess 4 and an associated swivellable backrest 6. On its lower edge, the backrest 6 is disposed to be swivellable about a transversely extending horizontal shaft 7 (FIG. 4) about which it can be swivelled from an upright operating position A (FIG. 1) into an approximately horizontal depositing position B (FIG. 2) and vice versa.

Figure 2:
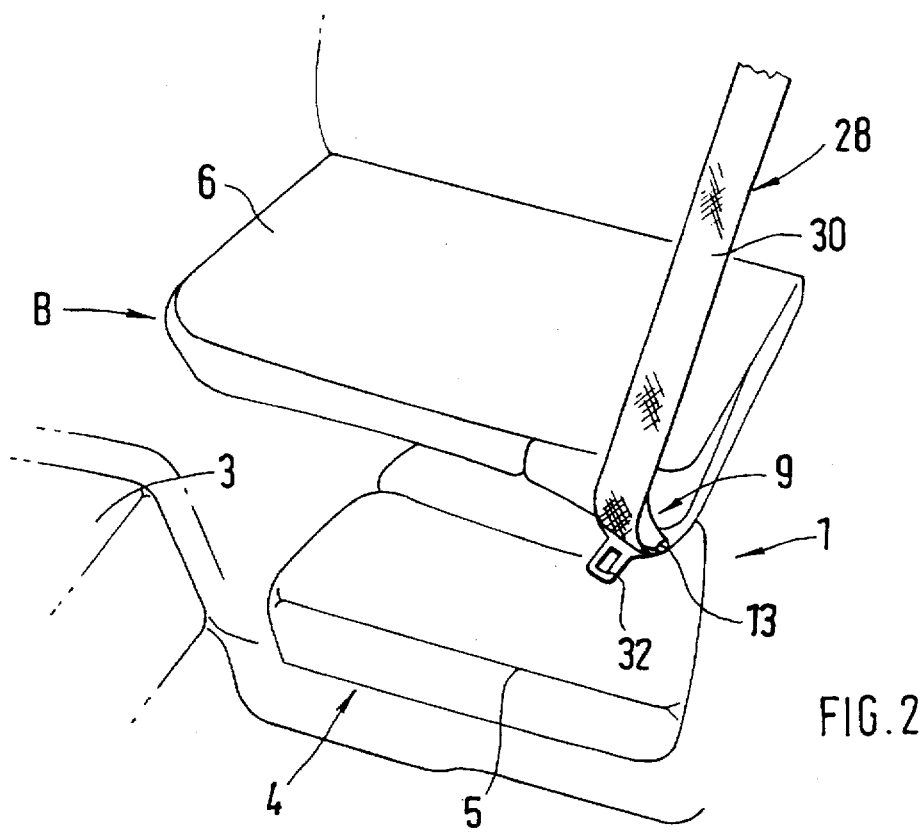
FIG. 2 is another perspective, partial view of a side of the rear seat system with the three-point seat belt in the deposited condition, with the backrest being displaced into its folded-away approximately horizontal depositing position.

In the swivelled-up or folded-up operating position A illustrated in FIG. 1, the backrest 6 is locked with the adjoining vehicle side panel 8. An operating part 9 for releasing the backrest locking device 10 is arranged in a laterally exterior area 11 of the backrest 6. The operating part 9 is composed of an elongated swivellable operating lever 12 and a grip section 13 connected therewith. The grip section 13 is fitted onto the upper end of the operating lever 12. The backrest locking device 10 comprises a lock 14 which is fastened to the backrest 6 and is in an operating connection with a locking pin 15 arranged on the body side and extending in the transverse direction of the vehicle. An upwardly projecting triggering lever 16 of the lock 14 interacts with the elongated operating lever 12 such that a curved section 17 of the operating lever 12 presses laterally against an upper end area of the triggering lever 16 (FIGS. 4 and 5).

The elongated operating lever 12 is rotatably disposed below the lock 14 which is constructed as a tumbler lock on a plastic upper covering part 18. For this purpose, an undercut receiving device 19 of the operating lever 12 is clipped onto a cylindrical molded-on section 20 of the covering part 18. In the upper area, as viewed in cross section, the covering part 18 has an interior, approximately rectangular hollow space 21 through which a partial area of the operating lever 12, which is bent at right angles, is guided. Above the linking of the operating lever 12, the covering part 18 has two inserted threaded sleeves 22 which are arranged above one another and which receive fastening screws for the lock 14 fitted on from the outside.

The lower end section of the covering part 18 is inserted into a sheet metal housing part 23 which is fixedly connected with a rear wall 24 of the backrest 6 e.g., by riveting. The housing part 23 also accommodates a plastic lower bearing part 25 for the swivellable bearing of the backrest 6.

Figure 4:
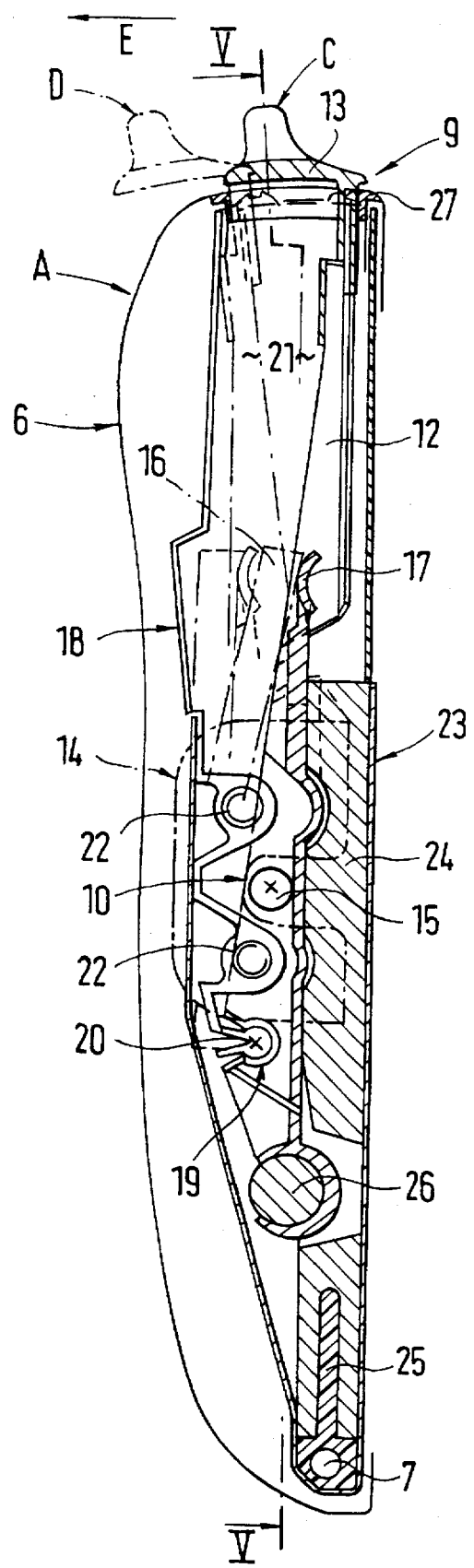
FIG. 4 is an enlarged sectional view along line IV—IV of FIG. 3.
Figure 5:
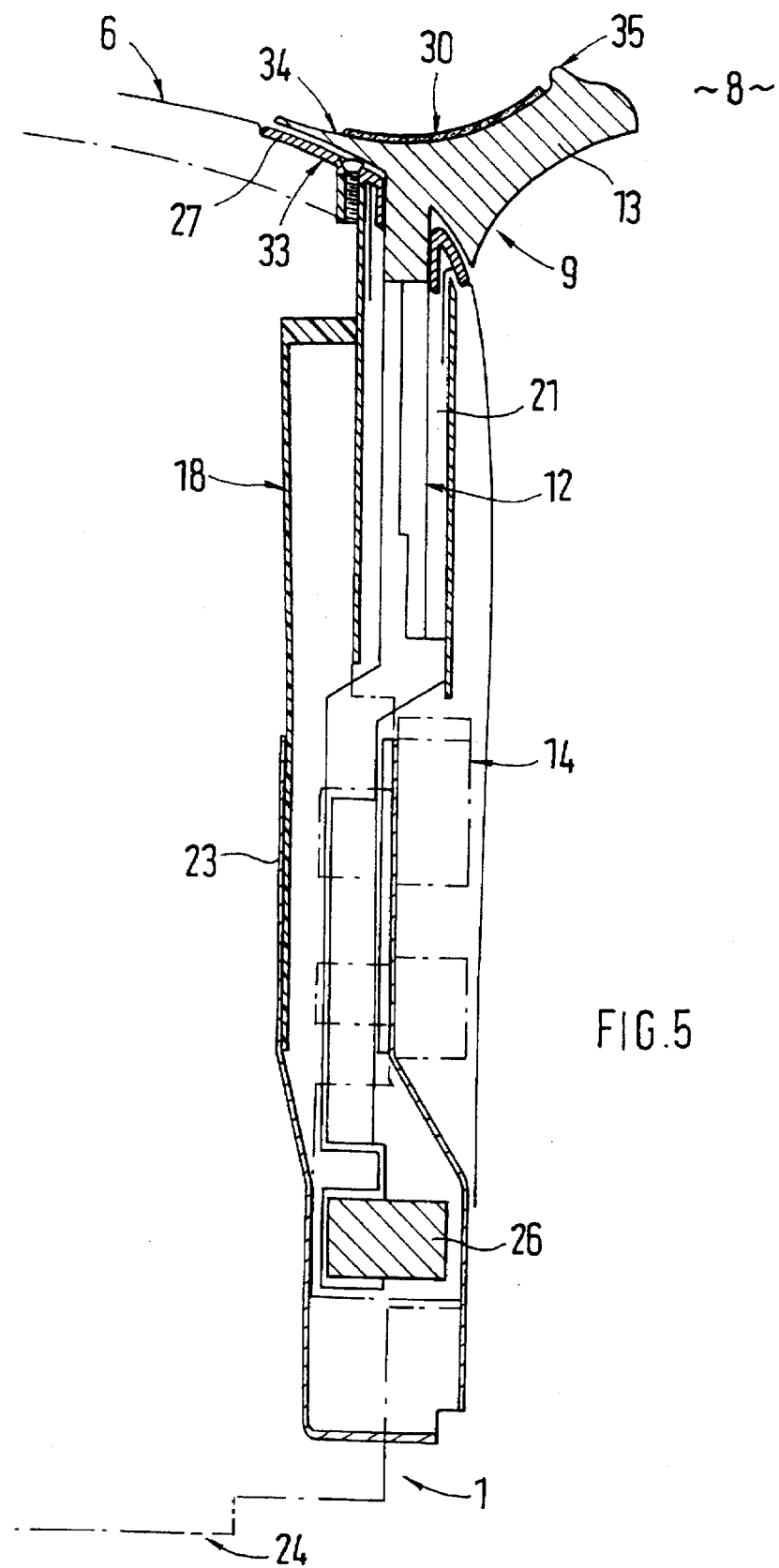
FIG. 5 is an enlarged sectional view along line V—V of FIG. 4.

As seen in FIG. 4, the operating lever 12 projects over the covering part 18 in the downward direction and is provided on its free end with an inserted mass part 26. Between the covering part 18 and the underside of the grip section 13, a rosette 27 is fastened by screwing or the like on the covering part 18.

For releasing the backrest locking device 10, the operating part 9 is swivelled in the longitudinal direction of the vehicle from a locked position C (shown in solid lines) into an unlocked position D (shown in dot-dash lines) in the driving direction E. The rear seat system 1 comprises two seats which are situated next to one another and have separate backrests 6. A separate three-point belt 28 is assigned to each seat.

Figure 3:
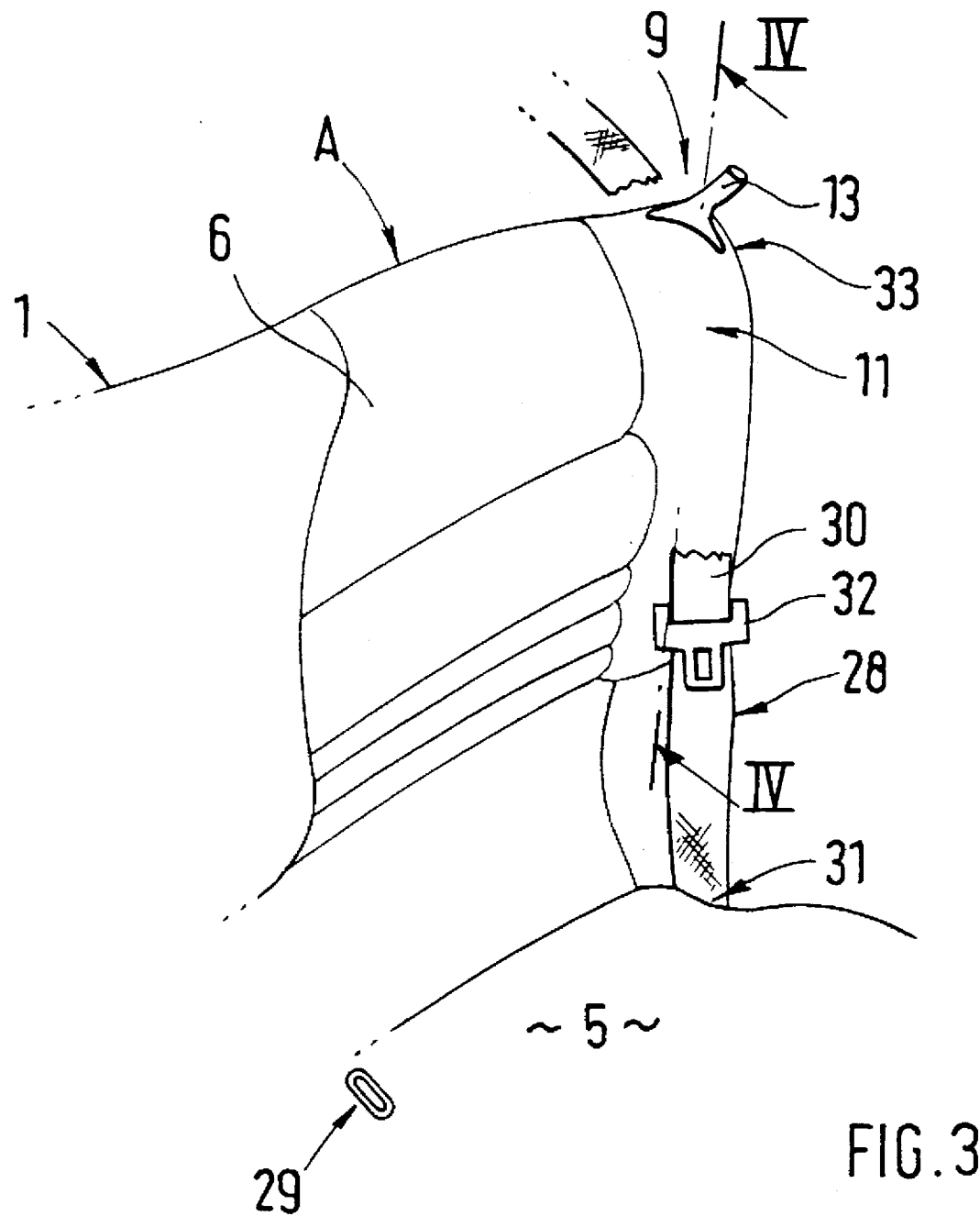
FIG. 3 is a view similar to FIG. 1 of the operating part of the backrest according to the invention.

Each three-point belt 28 consists of a belt buckle 29 arranged adjacent to the transmission tunnel 3 as well as of a belt strap 30 forming the lap and shoulder belt. At reference number 31 in FIG. 3, the belt strap 30 is anchored on the vehicle floor or on the vehicle side panel 8, from where it extends in the upward direction to an upper belt deflection element of known configuration.

Behind the belt deflection element, the belt strap 30 leads into a conventional belt retractor. On the belt strap 30, the buckle latch 32 is situated which can be connected with the belt buckle 29. When the three-point seat belt 28 is deposited, the belt strap 30 extends near the vehicle side panel 8. In order to avoid a clamping-in of the deposited belt strap 30 between the backrest 6 and the adjoining vehicle side panel 8, particularly during the folding-up of the backrest 6 from the depositing position B into the operating position A, the present invention provides that the operating part 9 is also used as a guiding element for the adjoining belt strap 30 of the deposited three-point seat belt 28.

For the aforementioned guiding purpose, the grip section 13 of the operating part 9, which extends in an upper curved transition area 33 of the backrest 6, has a guiding section 34 on its top side as seen in FIG. 5. The guiding section 34 rises in the direction of the vehicle side panel 8, which counteracts a slipping of the deposited belt strap 30 toward the outside. In the frontal view of FIG. 5, the guiding section 34 has a curved course.

The grip section 13, which extends in the transverse direction of the vehicle, has such a width that at least a significant part of the width of the belt strap 30 rests on the top side of the grip section 13. It is currently preferred that the grip section 13 has a slightly wider construction than the belt strap 30 so that the entire width of the belt strap 30 rests on the grip section 13. In addition, on the guiding section 34, and specifically on the end facing the vehicle side panel 8, an upwardly directed nose-shaped or bow-shaped elevation 35 can be provided to prevent the belt strap 30 from moving over the grip section 13 to the outside. The double function of the operating part 9 greatly simplifies the construction of the rear seat system 1 and guides the deposited three-point seat belt 28 in the transverse direction in all positions of the backrest 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Rear seat system for a passenger motor vehicle, comprising at least one backrest foldable from a locked upright operating position into an approximately horizontal deposited position, an operating part configured to release the backrest from the operating position, and three-point seat belts for occupants of the rear seat system, wherein in the deposited condition, a belt strap of the seat belts extends close to a vehicle side panel from a lower anchoring point to one of an upper belt deflection element and a belt retractor and is also situated in a swivel area of the backrest, and the operating part is located to act as a guiding element for the belt strap.

2. The rear seat system according to claim 1, wherein the operating part is operatively arranged in a laterally exterior area of the backrest, and comprises a swivellable operating lever which extends substantially inside the backrest and a grip section is operatively connected with the operating lever and arranged at a free end of the operating lever to extend outside the backrest.

3. The rear seat system according to claim 2, wherein the operating lever is rotatably linked below a lock of a backrest locking device on an upper covering part, and an upper section of the operating lever is bent at a right angle and is guided through a hollow space of the covering part, whereby the operating lever, via a curved section above the lock, interacts with a triggering lever of the lock.

4. The rear seat system according to claim 3, wherein the operating part is configured to be swivelled in a longitudinal driving direction of the motor vehicle for releasing the backrest locking device.

5. The rear seat system according to claim 2, wherein the grip section extends along an upper curved transition area of the backrest.

6. The rear seat system according to claim 2, wherein the grip section extends in a transverse direction such that at least substantially the entire width of the belt strap rests on a top side of the grip section.

7. The rear seat system according to claim 6, wherein the exterior grip section extends along an upper curved transition area of the backrest.

8. The rear seat system according to claim 2, wherein the grip section has a guide section on a top side thereof ascending in a direction of the vehicle side panel and counteracting a lateral slipping of the belt strap toward the outside thereof.

9. The rear seat system according to claim 8, wherein a frontal section of the guide section has a curved shape.

10. The rear seat system according to claim 8, wherein the guide section has an upwardly directed elevation on an end thereof facing the vehicle side panel.

* * * * *